(No Model.)
A. L. GREENE, Dec'd.
F. I. GREENE, Administratrix.
SPECTACLES.
No. 606,283. Patented June 28, 1898.
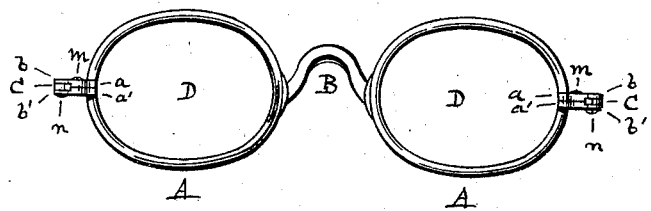
FIG. 1.
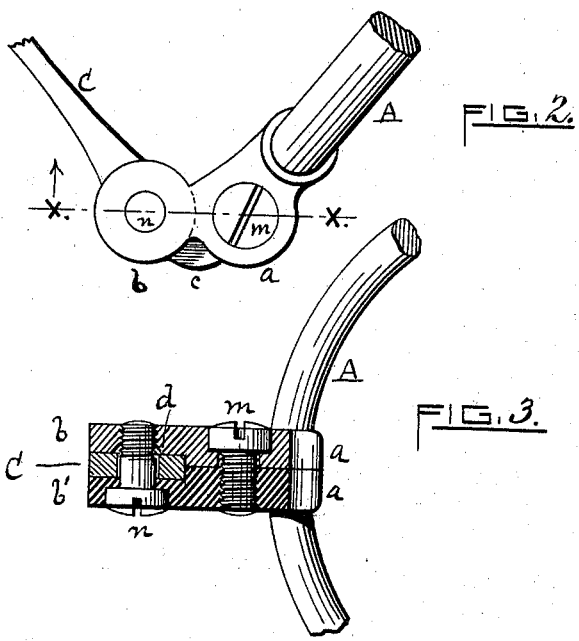
FIG. 2.
FIG. 3.
WITNESSES.
M. Foster
Charles T. Hannigan
INVENTOR.
Albert L. Greene
by Warren R. Perce
Atty.

United States Patent Office.

ALBERT L. GREENE, OF CRANSTON, RHODE ISLAND; FANNIE IDA GREENE, ADMINISTRATRIX OF SAID ALBERT L. GREENE, DECEASED, ASSIGNOR TO CHARLES A. WILKINSON, OF WARWICK, AND DUTEE WILCOX, OF PROVIDENCE, RHODE ISLAND.

SPECTACLES.

SPECIFICATION forming part of Letters Patent No. 606,283, dated June 28, 1898.

Application filed March 16, 1896. Serial No. 583,299. (No model.)

*To all whom it may concern:*

Be it known that I, ALBERT L. GREENE, of the town of Cranston, in the county of Providence, in the State of Rhode Island, have invented a certain new and useful Improvement in Spectacles; and I declare the following to be a specification thereof, reference being had to the accompanying drawings.

Like letters indicate like parts.

Figure 1 shows in elevation a pair of spectacles provided with my improved device. Fig. 2 is an enlarged top plan of my invention. Fig. 3 is an enlarged view of the same as seen on section-line $x\ x$ of Fig. 2.

My invention relates to spectacles in general, and more particularly to means for holding the temple-pieces in pivotal engagement with the bows in such a manner as to reduce the wear between the moving parts to a minimum.

Referring to the drawings, when operating in accordance with my invention I employ the usual bows A, split at their outer sides, the resulting ends $a$ and $a'$ being provided with outwardly-extending ears $b$ and $b'$. The rims of the glass are connected by the usual nose-piece B, said rims inclosing the glasses D. The ears $b$ and $b'$ of each glass rim or bow lie one upon the other, and in the upper ear $b$ is formed a countersunk perforation, in alinement with which is a threaded perforation in the lower ear $b'$, the former perforation having no threads and receiving a screw $m$, engaging the threads of the lower perforation. A second perforation is formed in the lower ear $b'$, which said perforation is countersunk to receive the head of an upwardly-directed screw $n$, which latter engages the threads of an alining perforation in the upper ear $b$.

The adjacent faces of the ears $b$ and $b'$ are cut away for a distance from their ends, as shown, resulting in the formation of a recess or slot for the reception of the temple C, which is held between the ears through the medium of a screw $n$, fitting closely a perforation therein.

As is well known, it is practically impossible to make a screw of the size employed in such a construction in any manner save with a die, and also that such dies must be slightly tapered at the initial portions of their openings, the result being that the last threads on the screw are not perfectly cut, and, in fact, the termination of the thread gradually shallows until the threads disappear. The result is that the screw cannot be turned completely home. Thus it will be seen that under normal conditions the last threads of the screw would necessarily lie within the perforation of the temple and give excessive friction to the latter and quickly cut it out. In order to prevent this condition, I countersink the threaded perforation in the ear $b$ by cutting away the inner face of the ear, so that the screw may be turned down sufficiently to escape the temple. In this construction there is not excessive friction between the temple and its pivot, and wear is reduced to a minimum.

I claim as a novel and useful invention and desire to secure by Letters Patent—

In a device of the class described the combination with the bows having projecting ears provided with means for holding them in mutual engagement, of a cut-away portion in the inner face of each ear, a threaded perforation in one ear having its inner end countersunk, a perforation in the second ear in alinement with the first-named perforation, a temple-piece held within the cut-away portion of the ears and having a perforation in alinement with the perforations of the ears, and a pivot passed through the perforation in one ear and the temple-piece and having its end screw-threaded and in engagement with the threads of the threaded ear perforation to hold the temple-piece in place.

ALBERT L. GREENE.

Witnesses:
 CHARLES A. WILKINSON,
 WARREN R. PERCE.